(12) United States Patent
Pollard

(10) Patent No.: US 8,553,137 B2
(45) Date of Patent: Oct. 8, 2013

(54) IMAGE DATA PROCESSING METHOD AND APPARATUS

(75) Inventor: Stephen B. Pollard, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 2262 days.

(21) Appl. No.: 11/491,364

(22) Filed: Jul. 24, 2006

(65) Prior Publication Data

US 2007/0053675 A1    Mar. 8, 2007

(30) Foreign Application Priority Data

Sep. 8, 2005  (GB) .................................. 0518278.7

(51) Int. Cl.
G03B 13/00    (2006.01)
H04N 5/232    (2006.01)
G02B 13/16    (2006.01)
H04N 5/225    (2006.01)

(52) U.S. Cl.
USPC ........... 348/349; 348/350; 348/354; 348/355; 348/335; 348/345

(58) Field of Classification Search
USPC ................................. 348/345–356
See application file for complete search history.

(56) References Cited

U.S. PATENT DOCUMENTS

| 4,404,594 | A |   | 9/1983 | Hannan |  |
|---|---|---|---|---|---|
| 4,967,280 | A | * | 10/1990 | Takuma et al. | 348/355 |
| 5,003,165 | A |   | 3/1991 | Sarfati |  |
| 5,107,337 | A |   | 4/1992 | Ueda |  |
| 5,170,202 | A | * | 12/1992 | Bell | 396/80 |
| 5,231,443 | A | * | 7/1993 | Subbarao | 396/93 |
| 5,745,175 | A |   | 4/1998 | Anderson |  |
| 7,330,212 | B2 | * | 2/2008 | Tomita | 348/345 |
| 7,394,943 | B2 | * | 7/2008 | Kinney et al. | 382/255 |
| 7,515,201 | B2 | * | 4/2009 | Nakahara | 348/354 |
| 7,522,209 | B2 | * | 4/2009 | Wakashiro | 348/345 |
| 7,528,882 | B2 | * | 5/2009 | Saori et al. | 348/335 |
| 7,576,796 | B2 | * | 8/2009 | Kanayama | 348/350 |
| 2003/0197803 | A1 |   | 10/2003 | Watanabe |  |
| 2004/0227843 | A1 | * | 11/2004 | Watanabe | 348/354 |

FOREIGN PATENT DOCUMENTS

| EP | 0437629 | 3/1995 |
|---|---|---|
| GB | 2237917 A | 5/1991 |
| GB | 2430096 | 3/2007 |

OTHER PUBLICATIONS

GB0518278.7 Search Report dated Oct. 17, 2005 (1 page).
GB0518278.7 Examination Report dated Jul. 22, 2009 (3 pages).
Abstract of JP 2004021736A Omron Tateisi Electronics Co Jan. 22, 2004.
Abstract of WO 03/046708 Jun. 5, 2003 Anoto AB (SE); Bryborn Mattias (SE); Sandstroem OLA (SE).
Abstract of WO0073983 Dec. 7, 2000 Iconizer AB (SE); Ericson Petter (SE); Hugosson OLA (SE).
Abstract of WO0126033 Apr. 12, 2001 Anoto AB (SE); Pettersson Mats Petter (SE); Edsoe Tomas (SE.
Abstract of WO0171643 Sep. 27, 2001 Anoto AB (SE); Wiebe Linus (SE).

* cited by examiner

Primary Examiner — Roberto Velez
Assistant Examiner — Pritham Prabhakher

(57) ABSTRACT

A method of processing image data generated using an image capture device comprising a lens, the method comprising, generating metric data for a plurality of regions of an image, the data representing a plurality of focus measures for each region generated at a plurality of lens positions, processing the metric data in order to cluster regions into at least one group on the basis of their respective focus measures, and determining a lens position for a group corresponding to a position of true focus for the group.

21 Claims, 6 Drawing Sheets

IMAGE DATA PROCESSING METHOD AND APPARATUS

RELATED APPLICATION

This application claims priority from co-pending United Kingdom utility application entitled, "Image Data Processing Method and Apparatus" having Ser. No. GB 0518278.7, filed Sep. 08, 2005, which is entirely incorporated herein by reference.

FIELD OF THE INVENTION

The present invention relates generally to the field of image data processing.

BACKGROUND

Autofocus systems in cameras and camcorders for automatically focusing on a scene or object are known. Generally with such systems, a camera lens projects light representative of an image onto an image sensor such as a CCD or CMOS device. An autofocus (AF) module can retrieve data representative of a portion of the projected image, which can be processed by a microprocessor (CPU) in order to determine contrast information from the portion, for example. Using a suitable metric, the contrast information can provide a measure of the accuracy of focus. The CPU can activate an autofocus motor of the camera to move the camera lens for focusing, and the procedure can repeat until a subject falls within a desired level of focus. U.S. Pat. No. 5,170,202 describes a method of autofocus based upon an image contrast metric similar to that described above.

A lens position for best focus is associated with the location of greatest image contrast as measured from a difference between brightest and darkest parts of an image.

In addition to contrast metrics, autofocus metrics can be based on various forms of high frequency image data such as gradients for example. In such cases it is necessary to overcome noise in the image data for better low light performance of the autofocus method.

In general, autofocus systems based on focus metrics have the disadvantage that the focus range must be searched at a granularity which is required to give accurate focus. Various techniques to speed up this search (such as stopping at a given point of focus when true focus is located) or locating the peak at a finer resolution than the search steps (such as using quadratic interpolation of the focus metric around a coarse peak), and methods to estimate true focus from as little as two steps are known. For example, U.S. Pat. No. 5,231,443 describes a rapid autofocus system. It is based on a depth from defocus method in which the difference in low frequency components of a pair of out of focus images is taken to depend on distance to the true focus. A ratio of the absolute power or absolute value of the low frequency components is used to define a metric which can be related to focus position.

The relationship only holds, in general, over a small region on either side of the point of true focus. At greater distances from the point of true focus, only very low frequency components of an image hold any useful information, and this is generally too little to reliably predict the true focus position.

SUMMARY

According to a first aspect of the present invention there is provided a method of processing image data generated using an image capture device comprising a lens, the method comprising, generating metric data for a plurality of regions of an image, the data representing a plurality of focus measures for each region generated at a plurality of lens positions, processing the metric data in order to cluster regions into at least one group on the basis of their respective focus measures, and determining a lens position for a group corresponding to a position of true focus for the group.

According to a second aspect of the present invention there is provided an image capture device operable to generate metric data for a plurality of regions of an image, the data representing a plurality of focus measures for each region generated at a plurality of lens positions, process the metric data in order to cluster regions into at least one group on the basis of their respective focus measures, and determine a lens position for a group corresponding to a position of true focus for the group.

BRIEF DESCRIPTION OF THE FIGURES

For a better understanding of the present invention, and to further highlight the ways in which it may be brought into effect, embodiments will now be described, by way of example only, with reference to the following drawings in which.

It should be emphasised that the term "comprises/comprising" when used in this specification specifies the presence of stated features, integers, steps or components but does not preclude the presence or addition of one or more other features, integers, steps, components or groups thereof.

DETAILED DESCRIPTION OF THE PREFERRED EMBODIMENTS

Figure 1:
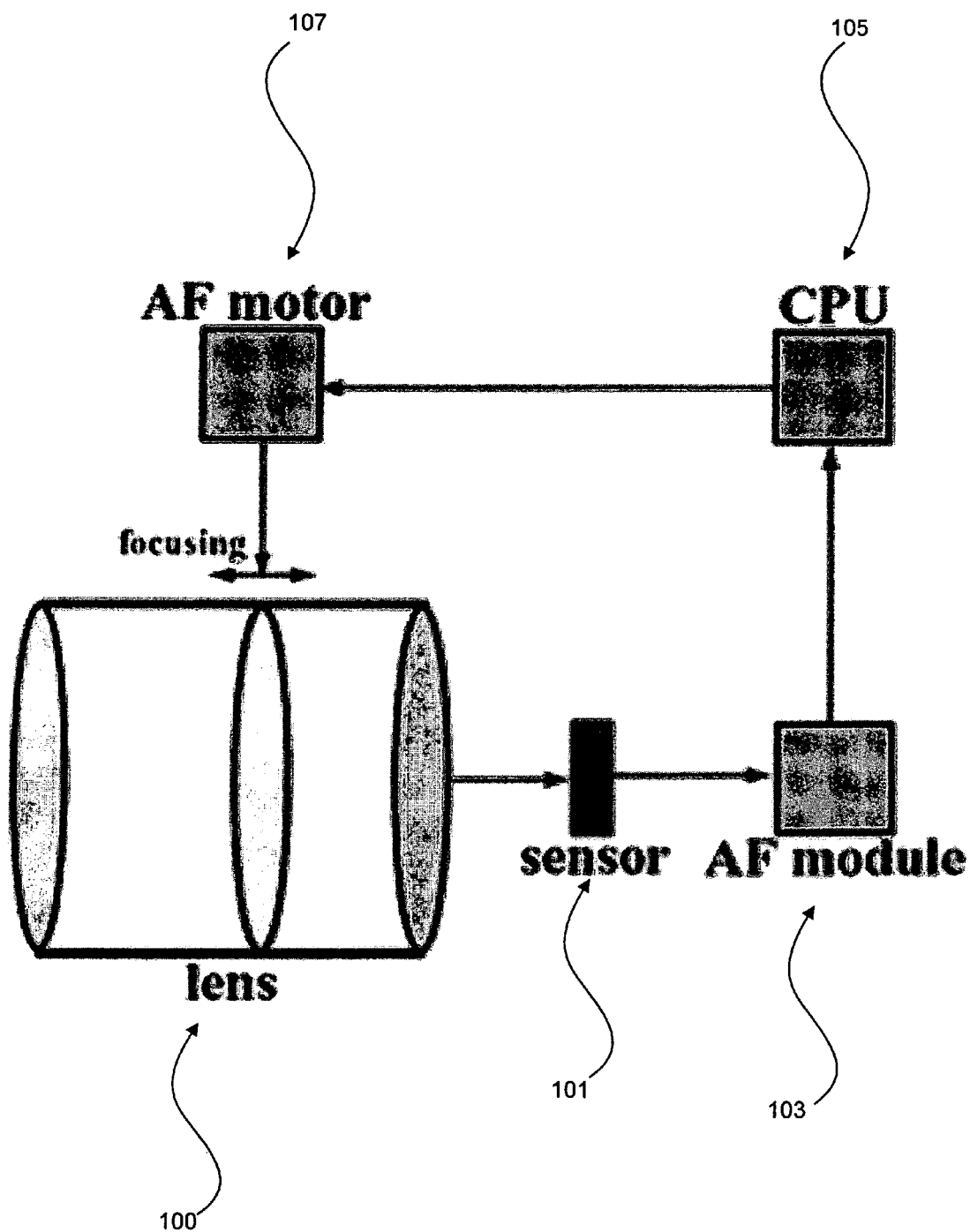
FIG. 1 is a schematic representation of a typical autofocus system.

FIG. 1 is a schematic representation of a typical autofocus system. A lens 100 of a camera, which can be a digital or analogue camera or camcorder for example, receives and focuses light onto a suitable sensor 101 in order to generate image data. Sensor 101 can be a CCD or CMOS device for example, or other suitable device. AF module 103 is operable to retrieve or receive a portion of the image data. CPU 105 is operable to process data relating to the portion. For example, the processed data can relate to contrast information of the image portion. Other alternatives are possible. The retrieved portion can represent a rectangular portion of the image for example, or other suitable shaped portion. CPU 105 can activate the auto focus motor 107 in order to facilitate movement of lens 100 for focusing based on the processing result. It will be appreciated that lens 100 is illustrated as comprising a number of elements. As is customary, an individual element of lens 100 can be adjusted, or multiple (e.g. some or all) elements can be adjusted in order to manipulate focus. For the sake of clarity, reference will be made herein to lens 100, and not to individual elements, but this is not intended to be limiting. Further, reference to adjustment of a lens position can include adjustment of an individual element of a lens, which element can be an internal element for example.

According to a preferred embodiment, image data generated at two respective focus positions of lens 100 is used to generate a power ratio which can be used as a focus metric. For a given lens position, the power ratio is a normalised power ratio between pairs of images captured at different local focus positions situated around the lens position. Preferably the ratio is generated in the spatial or Fourier domain. Other alternatives are possible.

So, for example, for a given initial lens position, a plurality of local focus positions around the initial lens position can be obtained by adjusting the lens position and/or by adjusting the position/setting of one or more elements of the lens to the extent necessary to alter focus of the lens by a desired amount. Hence, a local focus position is a position and/or setting of the lens and/or the elements therein at or around a given lens position which results in a particular focus setting of a device. For example, a lens can be zoomed out to its most extreme zoom position, and local focus positions can be obtained by slightly adjusting the lens position and/or that of any lens elements of the lens at or around the extreme zoom position. This can occur without, if appropriate, deviating from the extreme zoom position by a substantial amount (for example by adjustment of internal elements of the lens only).

In the spatial domain the ratio can be generated using the accumulated power of a band pass filter applied to each image. The ratio is normalised in the sense that if the accumulated power for an image A is P1 and for another image B is P2 then the normalised ratio is given by (P1−P2)/(P1+P2).

Figure 2:
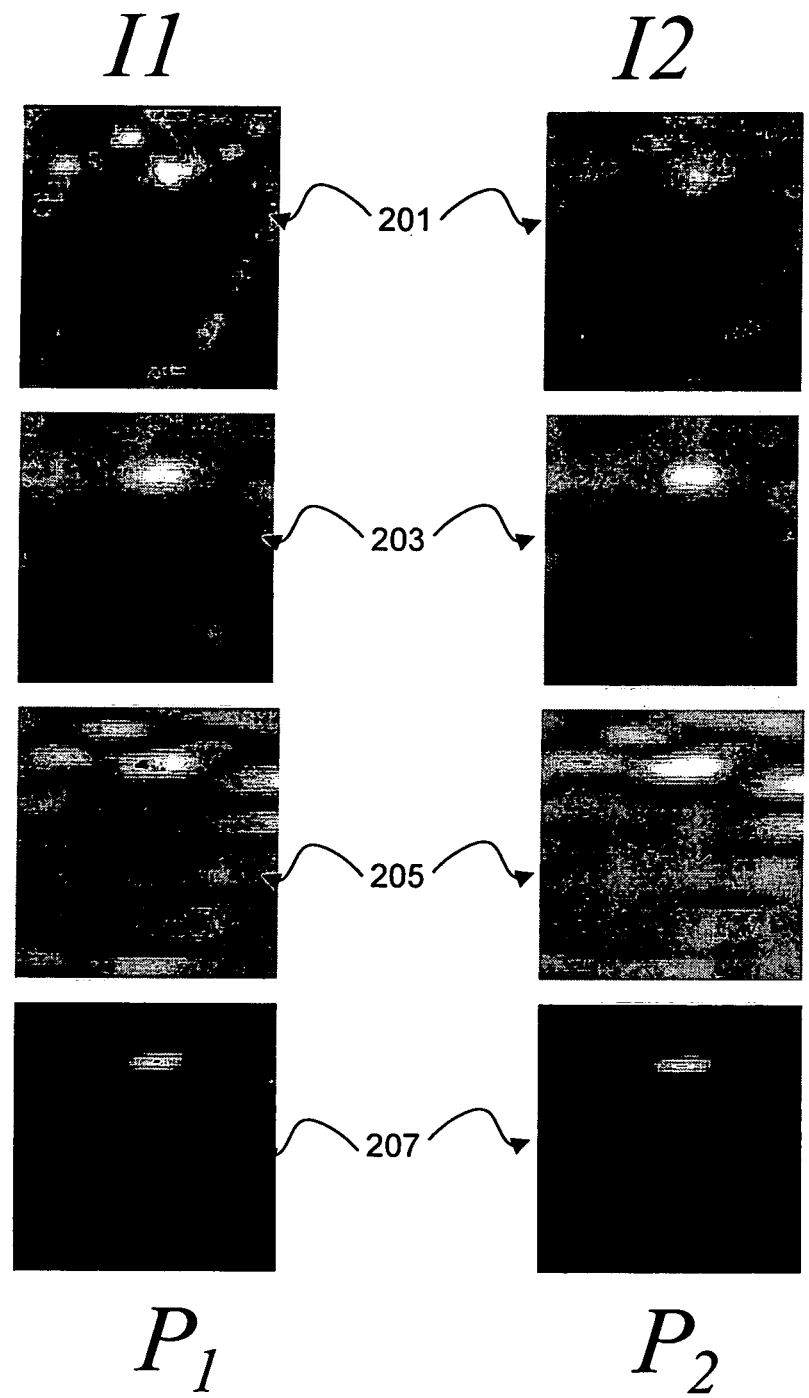
FIG. 2 is a flow diagram representing a procedure for generating an accumulated power of two image portions.

FIG. 2 is a flow diagram representing a procedure for generating the accumulated power of two image portions, I1 and I2, representing parts of a subject to be focussed.

The raw image data 201, as generated by sensor 101 for example, is filtered using a low pass filter to select a cut-off frequency on the high frequency end of image frequency content, thereby filtering a portion of the high spatial frequency content of the image. Low pass filtering can be performed by convolution with a Gaussian filter (such as a 2D Gaussian filter) for example. This results in smoothed image data 203. A Laplacian filter, or similar, to limit the low frequency end is then applied to data 203 resulting in the filtered data 205, in which a portion of the low spatial frequency content of the data 203 is filtered. Data 207 representing the powers P1 and P2 of image portions I1, I2 can then be obtained from the square of data 205, i.e. the square of the band-pass data.

The symmetrical band-pass power ratio PR for the images I1, I2 is defined by:

$$PR = \frac{\sum P1 - \sum P2}{\sum P1 + \sum P2}$$

where the accumulation is over the whole of the image region in question.

As P1 and P2 are powers and are therefore always positive (the square of the filtered data 205), the ratio is well behaved. Further, since it is normalised, the ratio lies between the values +1 and −1 and when plotted against the corresponding lens positions of a device at which the image data used to determine ratio was generated, has a zero crossing substantially at a lens position resulting in true focus. Hence, a value of zero (or substantially zero) for the normalised power ratio metric indicates a lens position at which the image in question will be focussed. At the zero crossing of the power ratio metric the two images that give rise to the zero uniformly straddle the focus position and hence have equal degrees of defocus, and the position corresponding to a power ratio metric always lies between the two image locations used to compute the metric.

Figure 3:
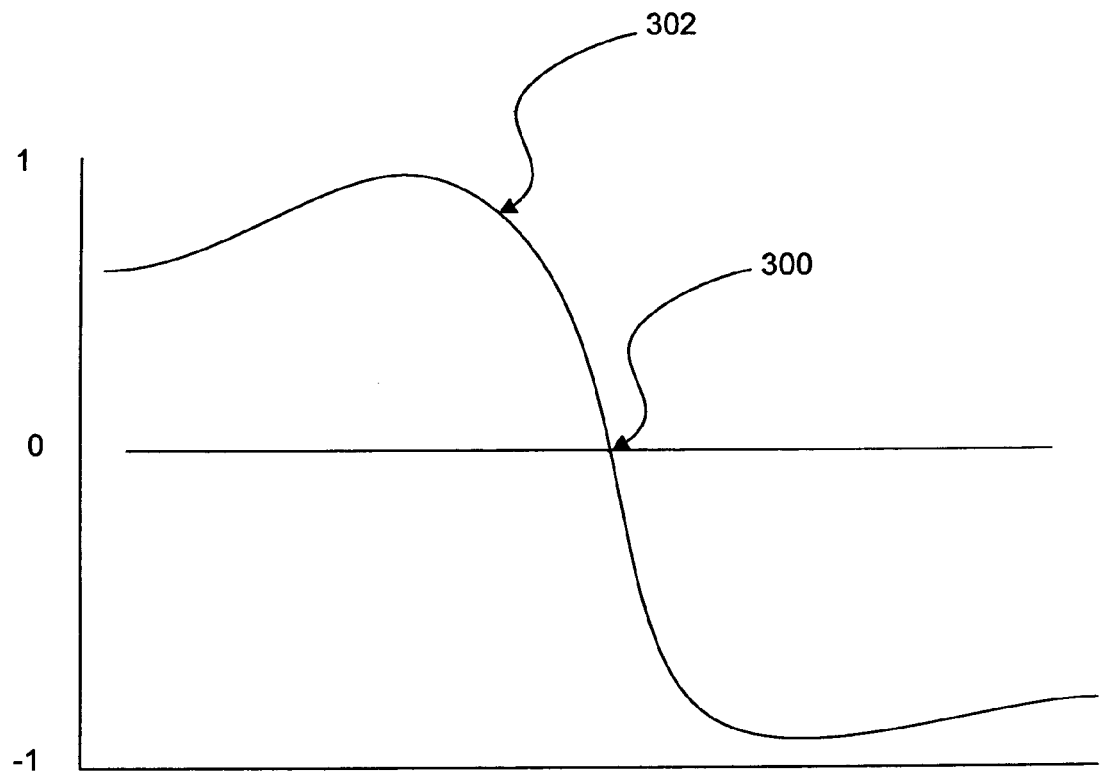
FIG. 3 is a schematic representation of a characteristic normalised power ratio metric curve.

The normalised band pass power ratio produces a characteristic curve. FIG. 3 is a schematic representation of such a characteristic curve.

The shape of the normalised ratio metric either side of true focus is largely independent of image content, and the ratio of the power from two different focus positions depends largely on the distance from true focus. The metric essentially combines power across the pass band of the band-pass filter. Hence it also depends on the frequency distribution of the image across the band pass filter frequency distribution. The tighter the pass band the more image independent the metric will be. In practice, however, the broadness of the band pass proves more stable than considering individual (or small groups of individual) frequency contributions in isolation (obtained using the Fourier transform).

FIG. 3 illustrates that the lens position for true focus is located at the zero crossing 300. There is a return to zero at each extreme from true focus (not shown). The location of the return to zero tends to positive and negative infinity as the frequency spectrum of the band pass is reduced (by increasing the size of the Gaussian filter for example). In practice it is much easier to find the zero crossing of the band pass power ratio than the peak of traditional focus metrics. More specifically, the sign of the power ratio (i.e. whether it is positive or negative in value) identifies the direction along the curve to be moved to reach true focus (the zero crossing). Hence, with reference to FIG. 3, a positively valued metric measure indicates that true focus is in the right-hand direction along the curve, while a negatively valued metric measure indicates that true focus is in the left-hand direction along the curve, and a lens can be adjusted accordingly in order to provide a focused image. Step size when searching for true focus (i.e. a amount by which a lens position is adjusted) can be considerable as the coarse level zero crossing can easily be detected. Once the coarse level zero crossing has been identified, a fine scale estimation can be obtained by capturing an additional image or more between existing samples. There is generally no need to recurse down to the zero crossing itself because, advantageously, in the region of the zero crossing the characteristic curve produced by the power ratio is substantially linear, and hence simple linear interpolation can be used to give an estimate of the focus position. Other alternatives are possible.

According to a preferred embodiment, true focus is determined by processing data representing at least two images captured at respective distinct local focus positions of a lens of a camera, in order to generate normalised power ratio data. That is to say, at a given lens position, the position of the lens and/or the focus setting of one or more lens elements, or the lens itself, is adjusted in order to provide two out of focus images from which a normalised power ratio metric for the images can be determined, thereby indicating a direction in which the lens should be adjusted in order to reach a point of true focus (i.e. the zero crossing of the metric curve). More specifically, the power ratio data is used to determine a notional position on a curve (such as that in FIG. 3 for example). The determined position is used in order to determine in which direction a camera lens should be moved or adjusted in order to achieve the desired level of focussing.

It will be appreciated that a given lens position can result in a plurality of images of differing focus due to the plurality of possible focus positions of the lens (or its elements) at or around the particular lens position as a result of lens and/or element adjustment as explained above.

If a lens position results in a generated normalised power ratio metric value at a point 302, for example, on the curve, it can be seen that adjustment of the lens, or an element thereof, in the direction (for example) necessary to reach true focus is that adjustment which causes the value of the normalised power ratio metric to reduce in value (i.e. in a right-hand direction along the curve). A coarse estimation of the point of true focus can therefore be determined. In the region of the zero crossing, the normalised power ratio metric curve is approximately linear. Therefore, if at least two points on a curve such as that of FIG. 3 have been determined by driving a lens of a device and generating a power ratio metric at the lens positions, linear interpolation can be used to estimate a more accurate position for the true focus, particularly, but not exclusively, if the two positions occur at points above and below true focus (i.e. the points have opposing signs).

If they do not have opposing signs, a further metric point for the curve can be generated with an opposing sign compared to the other generated points in order to perform interpolation of the point of true focus. Alternatively, the two points with the same sign can be used in order to extrapolate the zero crossing and hence the position of true focus.

Figure 4:
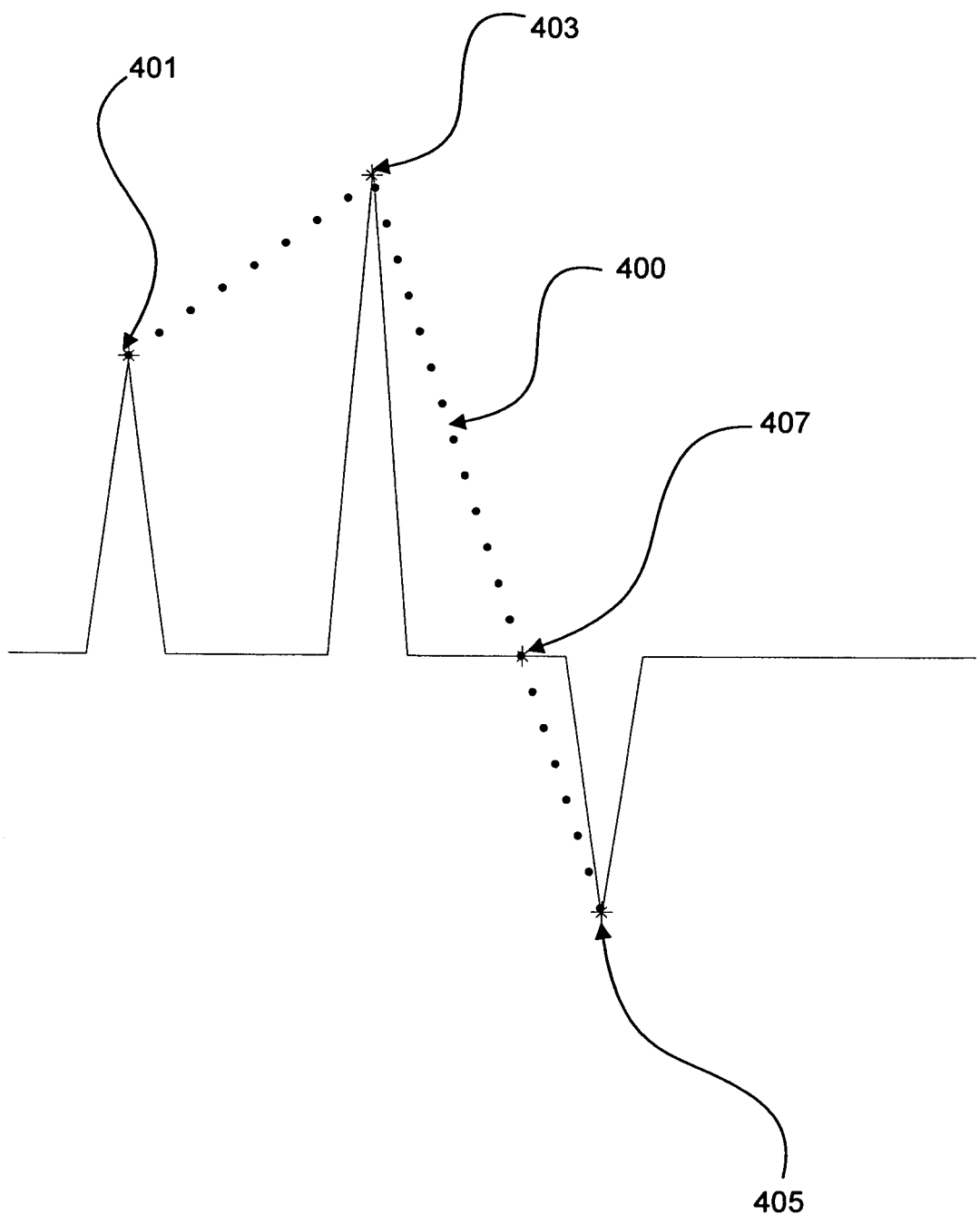
FIG. 4 is a schematic representation of a linear interpolation operation.

FIG. 4 is a schematic representation of a linear interpolation procedure. Points 401, 403 and 405 on a notional curve 400 are determined as explained above. Point 405 has an opposite sign compared to points 401 and 403, and therefore enables interpolation of point 407 (true focus).

The result from the initial metric calculation is used to determine a direction in which to drive the lens in order to generate subsequent metric values, i.e. the values of 401 and 403 indicate that the lens must be driven in a direction necessary to generate a metric value to the right of points 401,403 on the curve. The set of generated values is used to interpolate a position of true focus 407.

Hence, 401 (with a positive value) indicates a movement to the right hand direction along the curve is necessary, resulting in data at point 405 (from which 407 can be interpolated). If, for example, 403 was negatively valued, 407 could have been interpolated using 401 and 403 only.

It will be appreciated that the position of the zero crossing can be extrapolated using at least two positions on the metric curve which have the same sign (positive or negative), and the provision of positive and a negative valued metric data is not necessary in order to be able to determine true focus.

Figure 5:
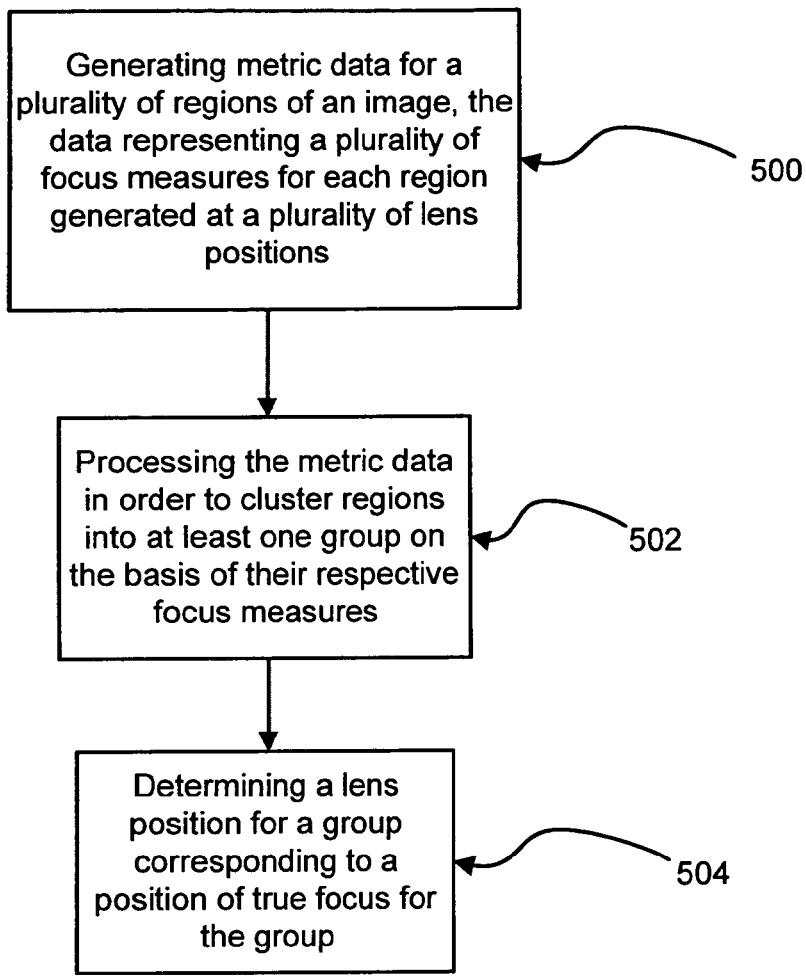
FIG. 5 is a flow diagram representing an exemplary procedure for auto focus.

FIG. 5 is a flow diagram of an exemplary procedure for determining a point of true focus. At step 502 image data generated at a plurality of local focus positions of the lens is processed using a suitable processor such as 105 for example, in order to generate first metric data representing a normalised power ratio metric. At 504 a lens position is adjusted on the basis of the first metric data, and at step 506 corresponding second metric data is generated for at least one local focus position at the new lens position. At step 508, an estimated point of true focus for the lens is determined on the basis of the first and second metric data.

In general, an image to be captured will comprise image regions in a number of focal planes as a result of the fact that constituent parts of the image reside in areas at different depths/distances from the device. According to an embodiment, an image to be captured can be segmented into a number of regions, which can be overlapping regions if desired. The segmentation allows image portions in different focal planes to be considered separately, if desired, in terms of focus.

In order to determine a region of image for segmentation, a number of spatially distinct (or overlapping if desired) focus ratio metric measures are generated at a plurality of focus positions of a lens of the device. Measures with similar values and/or profiles are then clustered into groups across the lens positions. Image regions can be assigned (segmented) on the basis of the clustering, with different image regions corresponding to different, consistent, depth planes for the image. For a given image region, a zero crossing of a focus metric measure generated for that region can be used to determine a point of focus for the region, and hence the depth plane into which the region was clustered.

Alternatively, clustering can be performed on the basis of the location of a zero crossing of a metric ratio measure rather than the metric value. Generally, the profile of a normalised metric curve for an image region in a particular depth plane will be the same as the profile of a normalised metric curve for a different image region which is in the same depth plane, but not the same as the profile of a normalised metric curve of an image region which is in a different depth plane. Hence, since the profiles differ, the position of the zero crossing will differ, which enables clustering of image regions to be performed using the zero crossing information.

An image can be segmented into regions on the basis of the similarity of metric curve profiles, and more specifically the zero crossings of the metric curves, or metric measures at any points of the curves using standard clustering algorithms such as k-means clustering, for example. The value of k can be increased until a residual error falls below a desired threshold. Clusters which are determined as comprising a particular set of normalised power metric measures for example (within the predetermined tolerance) can therefore represent image segments in a particular focal (depth) plane.

Figure 6:
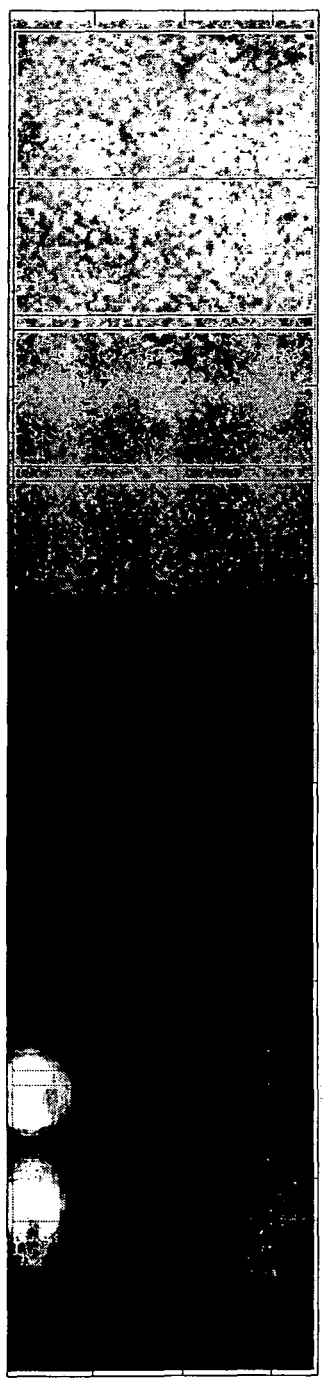
FIG. 6 is a schematic representation of a segmented image according to an embodiment.

FIG. 6 is a schematic representation of a portion 600 of an image in which image regions have been assigned (segmented) according to an embodiment.

The image portion represents part of a larger image comprising at least two major focal planes. The focal planes correspond to near and far field subjects, which in this case comprise a piece of fabric (such as a curtain) in the near field, and a plurality of lights in the far field. By determining a normalised power ratio metric at a plurality of lens positions for segments of the portion 600, it is possible to cluster the segments on the basis of the different depths of field of the portion 600. For the portion 600, two major depths of field (focal planes) are present. The portion has been segmented into seven regions—more or less can be used. On the basis of generated normalised power ratio metric data for the respective segments (regions) of portion 600, the segments can be grouped into two clusters corresponding to the two focal planes. More specifically, segments of portion 600 with substantially similar normalised power ratio metric measures, or with similar zero crossings of the normalised power ratio metric curve (to within a desired tolerance) are classified as belonging to a particular focal plane of the portion 600, and clustered accordingly, using k-means clustering for example. Other clustering techniques can be used as will be appreciated by those skilled in the art.

Only clusters with above a predetermined number of constituent segments need be chosen for focus analysis before image capture. Hence, if an image contains a large number of focal planes, only planes in which a large proportion of the image resides (i.e. large number of segments) need be considered for the purposes of focus. For example, following image segmentation for an image which comprises data relating to subjects in four focal planes, for which it is determined that two of the focal planes comprise two clustered segments respectively, whilst the other two comprise more than two clustered segments respectively, the two clusters comprising only two segments can be disregarded when determining suitable focal planes to be considered for the image in question. Other alternatives are possible. For example, an image can comprise subjects in a plurality of focal planes, and a cluster comprising a relatively small number of segments can be considered instead of being disregarded as described above.

Once a set of image segments/regions/portions have been clustered on the basis of a determination of the respective focal (depth) plane in which they reside, a position of true focus for a lens of a device can be determined for one or each of the focal planes under consideration. The determination of a point of true focus proceeds as described above, i.e. by determining a zero crossing of a normalised power ratio metric curve corresponding to a value of zero for the normalised power ratio metric. A point of true focus can be determined in this way for each cluster thereby providing different focal zones for an image corresponding to the focal planes for the image under consideration.

If image regions are segmented according to a position of the zero crossing of the normalised power ratio metric curve, this zero crossing information can be used to determine the point of true focus for the depth plane in question, thereby further reducing the amount of image data which needs to be captured.

A normalised power ratio metric generated according to an embodiment can be used to determine depth map information for an image.

The invention claimed is:

1. A method of processing image data generated using an image capture device comprising a lens, the method comprising:
   generating, by a processor in the image capture device, metric data for a plurality of segments of an image, the metric data representing a plurality of focus measures for each of the segments generated at a plurality of lens positions;
   processing, by the processor, the metric data in order to cluster the segments into at least two groups on the basis of the respective focus measures of the segments, wherein each of at least one of the two groups includes multiple ones of the segments; and
   determining, by the processor, a lens position for each of the groups corresponding to a position of true focus for the corresponding group.

2. A method as claimed in claim 1, wherein the lens position of true focus for each of the groups is a position for which metric data generated at the lens position of true focus has a value which is substantially zero.

3. A method as claimed in claim 1, wherein each of the groups comprises corresponding segments having a common focus measure.

4. A method as claimed in claim 3, wherein the common focus measure is a common value or focus profile.

5. A method as claimed in claim 1, wherein the image is segmented into regions corresponding to the at least two groups.

6. A method as claimed in claim 1, wherein the focus measures are determined using a normalised power ratio metric generated for each of respective ones of the lens positions.

7. A method as claimed in claim 1, wherein the focus measures relate to the location of a zero crossing of a normalized power ratio metric generated for each of respective ones of the lens positions.

8. A method as claimed in claim 6, wherein the normalised power ratio metric is a substantially image content independent metric.

9. A method as claimed in claim 1, wherein the focus measures are spatially distinct.

10. A method as claimed in claim 1, wherein the focus measures overlap.

11. A method as claimed in claim 1, wherein clustering the segments comprises:
    segmenting the image into the groups corresponding to consistent depth planes, a depth plane for the image determined using the focus measures for the lens positions.

12. A method as claimed in claim 11, wherein each depth plane corresponds to multiple ones of the segments with focus measures which are all substantially the same in value or profile.

13. A method as claimed in claim 1, wherein the measures are clustered across the plurality of lens positions.

14. A method as claimed in claim 11, wherein the groups correspond to different depth planes of the image.

15. A method as claimed in claim 1, wherein a lens position is identified for the group comprising the largest number of segments.

16. A method as claimed in claim 1, wherein a lens position is identified for the group corresponding to the closest depth plane of the image from the device.

17. A method as claimed in claim 1, wherein determining the lens position of true focus for each group comprises:
    adjusting a lens position in order to generate a focus measure which is substantially the same in value or in profile as a focus measure of at least one segment of that group.

18. A method as claimed in claim 17, further comprising adjusting the lens position to the determined estimated point of true focus.

19. A method of processing image data generated using an image capture device comprising a lens, the method comprising:
    generating metric data for a plurality of regions of an image, the data representing a plurality of focus measures for each region generated at a plurality of lens positions;
    processing the metric data in order to cluster regions into at least one group on the basis of their respective focus measures; and
    determining a lens position for the group corresponding to a position of true focus for the group;
    wherein the focus measures are determined using a normalised power ratio metric generated for each of respective ones of the lens positions,
    wherein the normalised power ratio metric is generated for each corresponding lens position by:
        generating first image data representing a pair of local images of respective different focus for the lens position;
        filtering said first image data by removing a portion of high spatial frequency content from the local images in order to provide first filtered data;
        processing said first filtered data in order to remove a portion of low spatial frequency content from the local images in order to provide second filtered data;
        determining power measures for respective ones of the local images using said second filtered data by obtaining a square of each of the values of said second filtered data for the respective processed local images; and
        determining a ratio of said power measures for the pair of local images.

20. An image capture device comprising:
a lens; and
a processor:
- generating metric data for a plurality of segments of an image, the metric data representing a plurality of focus measures for each of the segments generated at a plurality of lens positions;
- processing the metric data in order to cluster the segments into at least two groups on the basis of the respective focus measures of the segments, wherein each of at least one of the two groups includes multiple ones of the segments; and
- determining a lens position for each of the groups corresponding to a position of true focus for the corresponding group.

21. An image capture device comprising:
a lens; and
a processor:
- generating metric data for a plurality of regions of an image, the data representing a plurality of focus measures for each region generated at a plurality of lens positions;
- processing the metric data in order to cluster regions into at least one group on the basis of their respective focus measures; and
- determining a lens position for the group corresponding to a position of true focus for the group;
wherein the focus measures are determined using a normalised power ratio metric generated for each of respective ones of the lens positions,
wherein the normalised power ratio metric is generated for each corresponding lens position by:
- generating first image data representing a pair of local images of respective different focus for the lens position;
- filtering said first image data by removing a portion of high spatial frequency content from the local images in order to provide first filtered data;
- processing said first filtered data in order to remove a portion of low spatial frequency content from the local images in order to provide second filtered data;
- determining power measures for respective ones of the local images using said second filtered data by obtaining a square of each of the values of said second filtered data for the respective processed local images; and
- determining a ratio of said power measures for the pair of local images.

* * * * *